United States Patent [19]

Darms et al.

[11] 4,365,068
[45] Dec. 21, 1982

[54] CROSSLINKABLE BIS-IMIDYL DERIVATIVES

[75] Inventors: Roland Darms, Therwil; Vratislav Kvita, Muttenz; Gerd Greber, Binningen, all of Switzerland

[73] Assignee: Ciba-Geigy Corporation, Ardsley, N.Y.

[21] Appl. No.: 206,923

[22] Filed: Nov. 14, 1980

Related U.S. Application Data

[62] Division of Ser. No. 99,952, Dec. 3, 1979, Pat. No. 4,280,946, which is a division of Ser. No. 940,409, Sep. 7, 1978, Pat. No. 4,219,481, which is a division of Ser. No. 747,443, Dec. 6, 1976, Pat. No. 4,126,619.

[30] Foreign Application Priority Data

Dec. 19, 1975 [CH] Switzerland ............... 16510/75

[51] Int. Cl.$^3$ ............................................. C07D 403/14
[52] U.S. Cl. .................................. 548/435; 548/462; 548/465; 525/422; 528/321; 528/322; 528/170
[58] Field of Search ............... 525/422; 528/321, 170, 528/322; 260/326 S, 326 C

[56] References Cited

U.S. PATENT DOCUMENTS

| | | |
|---|---|---|
| 3,380,964 | 4/1966 | Grundschober et al. |
| 3,528,950 | 9/1970 | Lubowitz . |
| 3,575,924 | 4/1971 | Bargain . |
| 3,671,490 | 6/1972 | Bargain . |
| 3,689,464 | 9/1972 | Holub et al. |
| 3,700,617 | 10/1972 | Golownia et al. |
| 3,763,114 | 10/1973 | Saluti et al. |
| 3,862,129 | 1/1975 | Kwiatkowski . |
| 3,948,941 | 4/1976 | Patton . |
| 3,954,710 | 5/1976 | Bower et al. |
| 3,962,278 | 6/1976 | Bower et al. |
| 3,979,393 | 9/1976 | Kvita et al. |
| 4,111,771 | 9/1978 | Darms et al. |
| 4,126,619 | 11/1978 | Darms et al. |

FOREIGN PATENT DOCUMENTS

| | | |
|---|---|---|
| 2411683 | 10/1974 | Fed. Rep. of Germany . |
| 45-37994 | 12/1970 | Japan . |
| 49-35499 | 4/1974 | Japan . |

OTHER PUBLICATIONS

1979 Registry of Toxic Effects of Chemical Substances, pp. 279, 611.

*Primary Examiner*—Mark L. Berch
*Attorney, Agent, or Firm*—Luther A. R. Hall

[57] ABSTRACT

New crosslinkable bis-imidyl derivatives are described which can be produced by reaction of imidylphthalic acid derivatives, such as maleimidyl-phthalic acid anhydrides, with monomeric, oligomeric or polymeric diamines. The new crosslinkable bis-imidyl derivatives can be used for producing crosslinked polymers which are distinguished, in particular, by their stability to oxidation and to heat.

7 Claims, No Drawings

CROSSLINKABLE BIS-IMIDYL DERIVATIVES

This is a Divisional of application Ser. No. 99,952, filed on Dec. 3, 1979, now U.S. Pat. No. 4,280,946, issued July 28, 1981, which in turn is a Divisional of application Ser. No. 940,409, filed on Sept. 7, 1978, now U.S. Pat. No. 4,219,481, issued on Aug. 26, 1980, which in turn is a Divisional of application Ser. No. 747,443, filed on Dec. 6, 1976, now U.S. Pat. No. 4,126,619, issued on Nov. 21, 1978.

The present invention relates to new crosslinkable bis-imidyl derivatives and to their use for producing crosslinked polymers.

The invention relates to bis-imidyl derivatives of the formula Ia or Ib

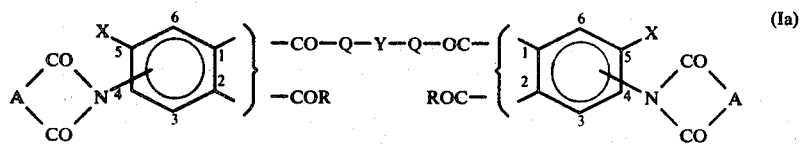

or

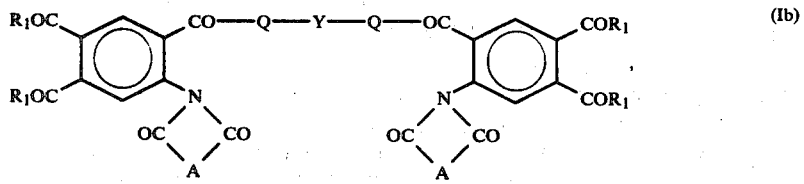

wherein the X s independently of one another represent hydrogen or, if the radical

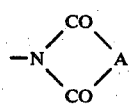

is in the 4-position of the benzene ring, also —COR$_2$, the R s and R$_2$ s independently of one another represent a hydroxyl group, an unsubstituted or substituted phenoxy group, an alkoxy group having 1-18 carbon atoms, or an —O$^-$M$^+$ group, the R$_1$ s independently of one another represent a hydroxyl group, an unsubstituted or substituted phenoxy group, an alkoxy group having 1-18 carbon atoms, an —O$^-$M$^+$ group, or two adjacent R$_1$ s together represent the —O— grouping, the A s independently of one another represent a radical of the formula

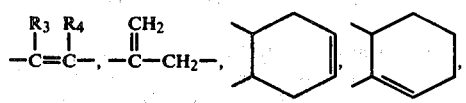

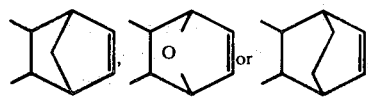

R$_3$ and R$_4$ independently of one another represent hydrogen, chlorine, bromine or methyl, M$^+$ represents an alkali metal cation, a trialkylammonium cation having 3-24, especially 3-12, carbon atoms or a quaternary ammonium cation, Q represents —NH— and Y a bivalent organic radical having at least two carbon atoms, or —Q—Y—Q— represents the grouping

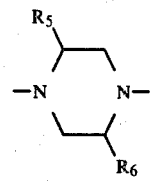

wherein R$_5$ and R$_6$ independently of one another represent hydrogen, methyl or phenyl, and to the corresponding cyclised derivatives.

The two A s in formulae Ia and Ib represent preferably identical radicals as defined, particularly a radical of the formula and especially a radical of the formula —CH=CH—.

If R, R$_1$ or R$_2$ represent substituted phenoxy groups, there are, in particular, phenoxy groups substituted by nitro groups, alkyl or alkoxy groups having 1 or 2 carbon atoms, or by halogen atoms, especially chlorine or fluorine, such as the 2-, 3- or 4-nitrophenoxy group, 2,4- or 3,5-dinitrophenoxy group or 3,5-dichlorophenoxy group, the pentachlorophenoxy group, 2-methylphenoxy group or 2-methoxyphenoxy group.

Alkoxy groups R, R$_1$ and R$_2$ can be straight-chain or branched-chain. Examples which may be mentioned are: the methoxy, ethoxy, n-propoxy, isopropoxy, n-butoxy, tert-butoxy, hexyloxy, octoxy, decyloxy, dodecyloxy, tetradecyloxy and octadecyloxy group. The groups preferred are unsubstituted phenoxy groups or alkoxy groups having 1-12 carbon atoms and especially 1-4 carbon atoms.

If R, R$_1$ or R$_2$ represent an —O$^-$M$^+$ group, M$^+$ represents, for example, the lithium, sodium, potassium, trimethylammonium, triethylammonium, methyl-diethylammonium or tri-n-octylammonium cation. Examples of quaternary ammonium cations M$^+$ are the benzyltrimethylammonium and tetramethylammonium cation. M+ preferably represents the sodium cation.

The various R s, $R_1$ s and $R_2$ s preferably each represent identical groups as defined. The R s preferably each represent a hydroxyl group and the $R_2$ s each a hydroxyl group or an alkoxy group having 1–4 carbon atoms. The $R_1$ s preferably each represent a hydroxyl group; in particular, however, two adjacent $R_1$ s together form the —O— grouping.

Organic radicals denoted by Y or —Q—Y—Q— can be monomeric, oligomeric or polymeric.

Suitable monomeric organic radicals Y (Q=—NH—) are, in particular, aliphatic radicals having at least two carbon atoms, or cycloaliphatic, carbocyclic-aromatic or heterocyclic-aromatic radicals.

In the case of oligomeric or polymeric organic radicals, Y preferably represents a structural element of the formula II

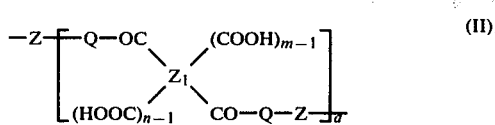

or a corresponding cyclised derivative
wherein
a represents a number from 1–100, preferably a number from 1–60, especially a number from 1–10, and the individual symbols m, n, Q, Z and $Z_1$ independently of one another represent the following:
m and n represent the number 1 or 2,
Q represents —NH— and
Z represents an aliphatic radical having at least 2 carbon atoms, a cycloaliphatic, carbocyclic-aromatic or heterocyclic-aromatic radical, or
Q and Z together with the adjacent Q in the formula Ia or Ib represent the grouping

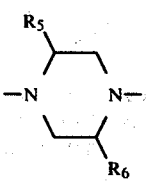

wherein
$R_5$ and $R_6$ independently of one another represent hydrogen, methyl or phenyl,
$Z_1$ represents an aliphatic radical having at least 2 carbon atoms or a cycloaliphatic, carbocyclic-aromatic or heterocyclic-aromatic radical, in which the carbonamide groups and carboxyl groups are bound to different carbon atoms, and the carboxyl groups, if $Z_1$ represents a cyclic radical and at least one of m and n the number 2, are each in the ortho-position with respect to a carbonamide group.

The compounds of the formula Ia or Ib according to the invention and the corresponding cyclised derivatives can be obtained by a process wherein
(a) a compound of the formulae IIIa

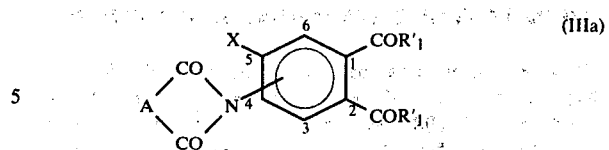

or
(b) a compound of the formula IIIb

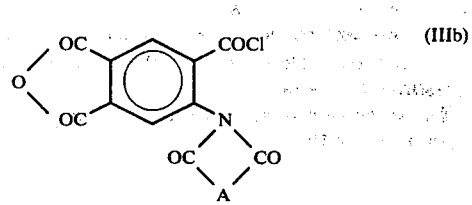

or a mixture of two different compounds of the formula IIIa or IIIb, wherein that which has been stated under the formulae Ia and Ib applies in respect of A and X, and the $R_1$'s independently of one another represent a hydroxyl group, an unsubstituted or substituted phenoxy group, an alkoxy group having 1–18 carbon atoms, or the two $R_1$'s together represent the —O— grouping, is reacted, in a molar ratio of at least 2:1, with a compound of the formula IV $$HQ-Y-QH \qquad (IV),$$

wherein in respect of Q and Y or —Q—Y—Q— that applies which has been stated under the formulae Ia and Ib; and the resulting compound of the formula Ia or Ib is optionally subsequently cyclised and/or converted into another derivative as defined, i.e. into a compound of the formula Ia or Ib wherein the R s, $R_1$ s or —$COR_2$ have another meaning as defined.

The conversion into other defined compounds of the formula Ia or Ib can be performed in a manner known per se, e.g. by hydrolysation of compounds with anhydride groupings to the corresponding free acids, reaction of the free acids with alcohols or salt-forming bases to give compounds of the formula Ia or Ib, wherein R, $R_1$ or $R_2$ represent alkoxy, phenoxy or —O$^-$M$^+$ groups as defined, or by transesterification.

Defined groups or radicals denoted by Y or Z can be unsubstituted or substituted, e.g. by halogen atoms such as fluorine, chlorine or bromine, or by alkyl or alkoxy groups each having 1 to 4 carbon atoms.

In formula II, the individual m, n, Q, Z and $Z_1$ can have different meanings.

Suitable aliphatic radicals Y or Z are, in particular, straight-chain or branched-chain alkylene groups having 2 to 12 carbon atoms, especially unsubstituted alkylene groups having 2–10 carbon atoms, and the alkylene chain can also be interrupted by hetero atoms, such as O, S or N atoms.

Y and Z as a cycloaliphatic radical represent, e.g., the 1,3- or 1,4-cyclohexylene group, the 1,4-bis-(methylene)cyclohexane or the dicyclohexylmethane group.

If Y or Z represents carbocyclic-aromatic radicals, these are preferably monocyclic radicals, condensed polycyclic radicals or condensed bicyclic aromatic radicals, and in the case of the last-mentioned the aromatic nuclei can be bound together by way of a bridge member.

Examples of suitable bridge members which may be mentioned are:

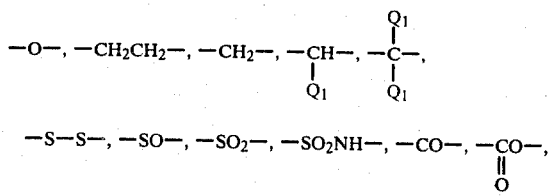

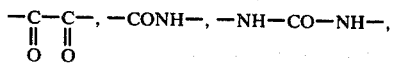

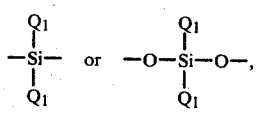

wherein
$Q_1$ represents an alkyl group having 1–6, preferably 1–4, carbon atoms, or a phenyl group.

Uncondensed bicyclic aromatic radicals Y or Z can also be bound together by way of two bridge members, such as two —$SO_2$— groups.

If Y or Z represents a heterocyclic-aromatic radical, such radicals are, in particular, heterocyclic-aromatic 5- or 6-membered rings containing O, N and/or S.

If $Z_1$ represents an aliphatic radical, these radicals are preferably unsubstituted, straight-chain or branched-chain saturated alkylene groups having 1–12 carbon atoms, especially unsubstituted alkylene groups having 2 to 10 carbon atoms.

Cycloaliphatic radicals denoted by $Z_1$ are, in particular, 5- or 6-membered cycloalkylene groups.

If $Z_1$ represents a carbocyclic-aromatic radical, this preferably contains at least one 6-membered ring; such radicals are, in particular, monocyclic or condensed polycyclic radicals or polycyclic radicals having several cyclic, condensed or uncondensed systems which can be bound together either direct or by way of bridge members. Suitable bridge members are the groups mentioned in the foregoing in respect of Y and Z.

If $Z_1$ represents a heterocyclic-aromatic radical, such radicals are, in particular, 5- or 6-membered heterocyclic-aromatic, optionally benzo-condensed, ring systems which contain O, N and/or S.

Carbocyclic-aromatic or heterocyclic-aromatic radicals represented by $Z_1$ can also be substituted, for example by nitro groups, alkyl groups having 1–4 carbon atoms, halogen atoms, especially chlorine, silyl groups, sulphonic acid groups or sulphamoyl groups.

Preferably, Y and the individual Z s where Q=—NH— independently of one another represent an unsubstituted alkylene group having 2–12 carbon atoms, or a monocyclic or uncondensed bicyclic aromatic radical unsubstituted or substituted by halogen atoms, alkyl or alkoxy groups each having 1–4 carbon atoms, and in the last-mentioned case the aromatic nuclei can be bound together direct or by way of the bridge member —O—, —$CH_2$— or —$SO_2$—.

The individual $Z_1$ s preferably represent independently of one another an unsubstituted alkylene group having 2–10 carbon atoms, an unsubstituted monocyclic aromatic radical, an unsubstituted condensed polycyclic aromatic radical or an uncondensed bicyclic aromatic radical, and in the case of the last-mentioned, the aromatic nuclei can be bound together by way of the bridge member —O— or —CO—.

Of the compounds of the formula Ia, those are preferred wherein the two radicals

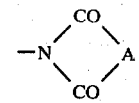

independently of one another are in the 3- or 4-position of the benzene ring, R represents a hydroxyl group and X a —COOalkyl group having 1–4 carbon atoms in the alkyl moiety, especially however hydrogen; as well as the corresponding cyclised derivatives.

Among the compounds of the formula Ib, those are preferred wherein the $R_1$ s each represent a hydroxyl group, and particularly such compounds wherein each two adjacent $R_1$ s together form the —O— grouping; and the corresponding cyclised derivatives.

Particularly preferred monomeric bis-imides of the formula Ia and Ib are those wherein the various symbols have the following meanings:
Q represents —NH—,
Y represents an unsubstituted alkylene group having 2–10 carbon atoms, the 1,3- or 1,4-phenylene group, the 4,4'-diphenylmethane group, the 4,4'-diphenylsulphone group or the 4,4'-diphenyl ether group,
A represents a radical

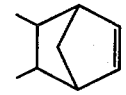

and particularly the radical —CH=CH—,
X represents a —COOalkyl group having 1–4 carbon atoms in the alkyl moiety, and especially hydrogen,
R represents hydrogen,
$R_1$ represents hydrogen, and particularly two adjacent $R_1$ s together represent the —O— grouping, and in formula Ia the two radicals

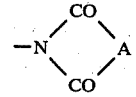

are each in the 3- or 4-position of the benzene ring; as well as the corresponding cyclised derivatives.

Preferred oligomeric or polymeric compounds are those with structural elements of the formula II wherein Q represents —NH—, Z represents an unsubstituted alkylene group having 2–10 carbon atoms, or a carbocyclic-aromatic radical, particularly the 1,3- or 1,4-phenylene group, the 4,4'-diphenyl ether group, the 4,4'-diphenylsulphone group or the 4,4'-diphenylmethane group, and $Z_1$ represents an unsubstituted alkylene group having 2–10 carbon atoms or a carbocyclic-aromatic radical, especially the 1,3- or 1,4-phenylene group, a benzenetriyl or benzenetetrayl group or the benzophenone ring system; as well as the corresponding cyclised derivatives.

More particularly preferred are compounds of the formula Ia and Ib with structural elements of the formula II wherein A, X, R and $R_1$ have the preferred meanings stated in the foregoing, Q represents —NH— and a an integer from 1-10 and wherein m and n represent the number 1, Z represents the 1,3- or 1,4-phenylene group, the 4,4'-diphenylmethane group or 4,4'-diphenyl ether group, and $Z_1$ represents an unsubstituted alkylene group having 2-10 carbon atoms, the 1,3- or 1,4-phenylene group, and of Z and $Z_1$ only one represents the 1,4-phenylene group;

m and n represent the number 2, Z represents the 4,4'-diphenylmethane group or 4,4'-diphenyl ether group and $Z_1$ represents a benzenetetrayl group or the benzophenone ring system;

m represents the number 1 and n the number 2, Z represents the 4,4'-diphenylmethane group or 4,4'-diphenyl ether group, and $Z_1$ represents a benzenetriyl group; as well as the corresponding cyclised derivatives.

The starting compounds of the formulae IIIa and IIIb can be obtained by a process wherein an amine of the formula V

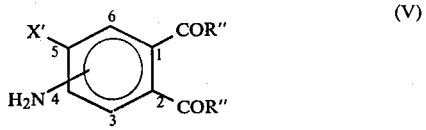 (V)

is reacted with an anhydride of the formula VI

 (VI)

and the resulting amidocarboxylic acid of the formula VII

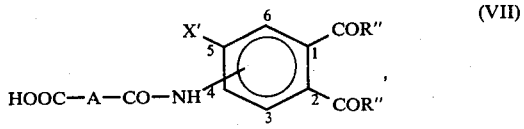 (VII)

is subsequently cyclised and optionally converted into another derivative as defined of the formula IIIa or into a compound of the formula IIIb.

In the above formulae V to VII, A has the given meaning and X' represents hydrogen or, if the amino group is in the 4-position of the benzene ring, also —$COR_2'$, R" and $R_2'$ represent hydroxyl, phenoxy, alkoxy or —$O^-M^+$ groups corresponding to R or $R_2$, with however phenoxy groups R" and $R_2'$ being free from electronegative substituents such as nitro groups or halogen atoms, and $R_2'$ in the case where R" is —OH having a meaning other than —$O^-M^+$, and in the case where R" is —$O^-M^+$ a meaning other than —OH.

Compounds of the formula IIIa wherein $R_1'$ and/or $R_2$ (where X=—$COR_2$) represent phenoxy groups having electronegative substituents are advantageously produced by reaction of the corresponding anhydrides or acid anhydrides with suitable alcohols, or by transesterification of compounds of the formula IIIa, with $R_1'$ and/or $R_2$ being alkoxy or phenoxy which is free from electronegative substituents.

The reaction of the amines of the formula V with the anhydride of the formula VI can be performed in the melt, in an aqueous or aqueous-organic medium or preferably in an organic medium.

For cyclisation of the amidocarboxylic acid of the formula VII, it is possible to use customary catalysts such as sodium acetate or triethylamine, and/or dehydrating agents, e.g. acetic acid anhydride. Simultaneously with the formation of the imide there occurs under certain circumstances, i.e. depending on the nature of the substituent R", also the formation of the anhydride, e.g. if R"=—OH.

The conversion of the resulting compounds into other defined derivatives of the formula IIIa or into compounds of the formula IIIb is performed in a conventional manner, for example by the methods mentioned in the foregoing.

Acid chlorides of the formula IIIb can be produced, e.g., by reaction of compounds of the formula IIIa, wherein X=—$COR_2$ and $R_2$=—OH or —$O^-M^+$, with suitable chlorinating agents, such as thionyl chloride.

The compounds of the formula IV used in the process according to the invention are known and can be produced in a manner known per se.

The following may be mentioned as examples of monomeric diamines of the formula IV: o-, m- and p-phenylenediamine, diaminotoluenes such as 2,4-diaminotoluene, 1,4-diamino-2-methoxybenzene, 2,5-diaminoxylene, 1,3-diamino-4-chlorobenzene, 4,4'-diamino-diphenylmethane, 4,4'-diaminodiphenyl ether, 4,4'-diaminodiphenyl thioether, 4,4'-diaminodiphenylsulphone, 2,2'-diaminobenzophenone, 4,4'-diaminodiphenylurea, 1,8- or 1,5-diaminonaphthalene, 2,6-diaminopyridine, 2,4-diaminopyrimidine, 1,4-piperazine, 2,4-diamino-s-triazine, di-, tri-, tetra-, hexa-, hepta-, octa-, deca- and dodecamethylenediamine, 2,2-dimethylpropylenediamine, 2,5-dimethylhexamethylenediamine, 4,4-dimethylheptamethylenediamine, 3-methylheptamethylenediamine, 3-methoxyhexamethylenediamine, 2,11-diaminododecane, 2,2,4- and 2,4,4-trimethylhexamethylenediamine, 1,2-bis(3-aminopropoxy)-ethane, N,N'-dimethylethylenediamine, N,N'-dimethyl-1,6-diaminohexane, as well as the diamines of the formulae $H_2N(CH_2)_3O(CH_2)_2O(CH_2)_3NH_2$ and $H_2N(CH_2)_3S(CH_2)_3NH_2$, and 1,4-diaminocyclohexane.

It is also possible to use mixtures of different monomeric diamines of the formula IV.

Compounds of the formula IV wherein Q s each represent —NH—, and Y represents a structural element of the formula II, can be obtained in a manner known per se by condensation or di-, tri- or tetracarboxylic acid derivatives of the formula VIII

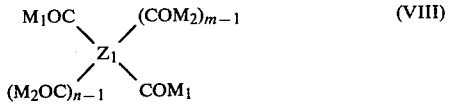 (VIII)

wherein m, n and $Z_1$ have the meanings given under formula II and $M_1$ represents a chlorine atom, a hydroxyl group, an unsubstituted or substituted phenoxy group or an alkoxy group having 1-18 carbon atoms, or $M_1$, if m and/or n=2, together with an $M_2$ forms the —O— grouping, whereby the groups —COM$_1$ and —COM$_2$ are bound to different carbon atoms, and the —COM$_1$ group or groups, if Z$_1$ represents a cyclic radical and m and/or n=2, is or are in the ortho-position with respect to a —COM$_2$ group, with an excess of a diamine of the formula IX

HQ—Z—QH  (IX)

wherein in respect of Q and Z or —Q—Z—Q— that applies which is stated under formula I; and possible subsequent cyclisation.

It is also possible to use mixtures of different compounds of the formula VIII and diamines of the formula IX.

If R$_1'$ in formula IIIa or M$_1$ in formula VIII represents unsubstituted or substituted phenoxy groups or alkoxy groups having 1–18 carbon atoms, preferably 1–12 and especially 1–4 carbon atoms, such groups are, for example, those mentioned in the foregoing in the discussion of R, R$_1$ and R$_2$.

The compounds of the formulae VIII and IX are known per se. As diamines HQ—Z—QH it is possible to use, for example, compounds of the aforementioned type. Examples of suitable di-, tri- and tetracarboxylic acid derivatives of the formula VIII are: malonic acid, dimethylmalonic acid, succinic acid, glutaric acid, adipic acid, suberic acid, sebacic acid and dodecanedicarboxylic acid, 1,3-cyclopentanedicarboxylic acid, hexahydroisophthalic acid, hexahydroterephthalic acid, terephthalic acid, isophthalic acid, 4,4'-dicarboxydiphenylethane, naphthalene-2,6-dicarboxylic acid, thiophene-2,5-dicarboxylic acid and pyridine-2,3-dicarboxylic acid, as well as the corresponding dichlorides and diesters as defined; trimellitic acid-1,2-anhydride-chloride, (1,3-dioxo-benzo[c]oxalane-5-carboxylic acid chloride), trimellitic acid anhydride as well as esters as defined; pyromellitic dianhydride, 3,3',4,4'-benzophenone-tetracarboxylic acid dianhydride, 2,3,3',4'-benzophenone-tetracarboxylic acid dianhydride, 2,2'3,3'-benzophenone-tetracarboxylic acid dianhydride, 3,3',4,4'-diphenyl-tetracarboxylic acid dianhydride, bis(2,3-dicarboxyphenyl)-methane-dianhydride, bis(2,5,6-trifluoro-3,4-dicarboxyphenyl)-methane-dianhydride, 2,2-bis(2,3-dicarboxyphenyl)propane-dianhydride, bis(3,4-dicarboxyphenyl) ether dianhydride, bis-(3,4-dicarboxyphenyl)-sulphone-dianhydride, N,N-(3,4-dicarboxyphenyl)-N-methylamine-dianhydride, bis-(3,4-dicarboxyphenyl)-diethylsilanedianhydride, 2,3,6,7- and 1,2,5,6-naphthalene-tetracarboxylic acid-dianhydride, 2,6-dichloronaphthalene-1,4,5,8-tetracarboxylic acid-dianhydride, thiophene-2,3,4,5-tetracarboxylic acid-dianhydride, pyrazine-2,3,5,6-tetracarboxylic acid-dianhydride, pyridine-2,3,5,6-tetracarboxylic acid-dianhydride.

The dicarboxylic acid derivatives used are preferably dicarboxylic acid dichlorides.

The condensation of the compounds of the formula IIIa, IIIb and VIII with the compounds of the formula IV or with the diamines HQ—Z—QH is performed in a manner known per se, advantageously at temperatures of about −50° C. to +300° C. The condensation can be performed in the melt or preferably in an inert organic solvent or in a solvent mixture. For the condensation in solution, temperatures of −20° C. to +50° C. are preferred. For the reaction of the compounds of the formulae IIIa and IIIb with the compounds of the formula IV, the addition of known polymerisation inhibitors, such as hydroquinones, brenzcatechin, cresoles, e.g. ditert-.butylcresole, can under certain circumstances be advantageous.

As organic solvents it is possible to use, e.g.:

optionally chlorinated aromatic hydrocarbons, such as benzene, toluene, xylenes and chlorobenzene;

chlorinated aliphatic hydrocarbons, such as methylene chloride, chloroform, tetrachloroethane and tetrachloroethylene;

aliphatic and cycloaliphatic ketones, such as acetone, methyl ethyl ketone, cyclopentanone and cyclohexanone;

cyclic ethers, such as tetrahydrofuran, tetrahydropyrane and dioxane;

cyclic amides, such as N-methyl-2-pyrrolidone, N-acetyl-2-pyrrolidone and N-methyl-ε-caprolactam;

N,N-dialkylamides of aliphatic monocarboxylic acids having 1–3 carbon atoms in the acid moiety, such as N,N-dimethylformamide, N,N-dimethylacetamide, N,N-diethylacetamide and N,N-dimethylmethoxyacetamide;

ethylene glycol monoalkyl ether and ethylene glycol dialkyl ethers each having 1–4 carbon atoms in the alkyl moieties, such as ethylene glycol monomethyl ether, ethylene glycol monoethyl ether, ethylene glycol monoisopropyl ether and ethylene glycol mono-n-.butyl ether, ethylene glycol dimethyl ether and ethylene glycol diethyl ether;

alkyl esters of aliphatic monocarboxylic acids having a total of 2–6 carbon atoms, such as formic acid or acetic acid methyl ester, formic or acetic acid ethyl ester and formic acid or acetic acid n-butyl ester.

hexamethylphosphoric acid triamide (hexametapol);

N,N,N',N'-tetramethylurea;

tetrahydrothiophene dioxide (sulpholane);

dialkyl sulphoxides, such as dimethyl and diethyl sulphoxide.

It is also possible to use mixtures of such solvents.

Preferred solvents are N,N-dialkylamides of aliphatic monocarboxylic acids having 1–3 carbon atoms in the acid moiety, especially N,N-dimethylacetamide, as well as cyclic amides, such as N-methyl-pyrrolidone.

The hydrochloric acid forming on condensation or polycondensation of compounds of the formula IIIb or VIII, wherein M$_1$ represents chlorine, with the diamines HQ—Y—QH or HQ—Z—QH can be removed by neutralisation with basic substances such as calcium hydroxide or triethylamine, or by reaction with an epoxide compound such as ethylene oxide or propylene oxide, and by washing out with suitable solvents, e.g. water.

The condensation reactions are advantageously performed with the exclusion of moisture, e.g. in an inert gas atmosphere, such as nitrogen.

The compounds of the formulae IIIa and IIIb are reacted with the compounds of the formula IV in a molar ratio of at least 2:1. If the compound of the formula IV is a monomeric diamine, this diamine is advantageously used in a stoichiometric amount or slightly lesser amount. For the reaction with oligomers or polymers of the formula IV which contain terminal amino groups, the reactants are used preferably in a stoichiometric amount.

In the case of the eventual cyclisation of the compounds of the formula Ia or Ib or IV resulting on condensation, there occurs imide formation, and with compounds of the formula Ib optionally also anhydride formation. Cyclisation is performed, in a manner known per se, chemically or preferably thermally.

Chemical cyclisation is advantageously performed by treatment with a dehydrating agent alone or in admixture with a tertiary amine. Suitable for the purpose are, e.g., acetic acid anhydride, propionic acid anhydride and dicyclohexylcarbodiimide, or mixtures of acetic acid anhydride and triethylamine.

Thermal cyclisation is performed by heating at temperatures of about 50°–250° C., preferably about 100°–150° C., and optionally with the addition of a solvent and/or of a water-entrainer such as xylenes or toluene. At temperatures above about 150° C. there also occurs, at least partially, a crosslinking.

The crosslinking of the compounds of the formula Ia or Ib is likewise performed in a manner known per se, chemically, thermally or under the influence of electromagnetic waves, particularly light.

Chemical crosslinking is generally carried out at temperatures of about 50° to 250° C. and in the presence of known radical initiators, such as inorganic and organic peroxides or azo compounds, e.g. hydrogen peroxide, tert. butylhydroxy peroxide, peracetic acid, benzoyl peroxide, tert.butylperbenzoate, cumolhydroperoxide, dicumyl peroxide and α,α'-azo-iso-butyronitrile.

Thermal crosslinking is advantageously performed by heating at temperatures up to about 350° C., preferably 150°–250° C., and optionally in the presence of radical initiators of the aforementioned type.

For crosslinking under the influence of electromagnetic waves, suitable compounds are, in particular, those of the formula Ia or Ib wherein A represents a radical of the formula

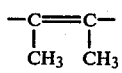

Crosslinking can be performed, e.g., by means of irradiation with X rays or UV light, and optionally in the presence of sensitisers, such as benzene, 1,4-diacetylbenzene, phenol, benzonitrile, acetophenone, benzophenone, benzaldehyde, di-isopropyl ketone and fluorene.

The crosslinkable compounds of the formula Ia and Ib according to the invention and the corresponding cyclised derivatives are valuable starting products for producing crosslinked polymers having good mechanical, electrical and/or thermal properties. The crosslinked polymers obtainable therewith are distinguished in particular by their stability to oxidation and to heat. Compared with known bis-imides, especially bis-maleimides such as N,N'-4,4'-diphenyl-methane-bis-maleimide, the bis-imides according to the invention are distinguished also by their easier availability in that the corresponding amide acids, in contrast to known bis-maleamide acids, can be cyclised, and possibly simultaneously crosslinked, not only chemically but also very readily thermally, i.e. by mere heating.

Compared with the mentioned bis-maleamide acids, the non-cyclised compounds of the formula Ia and Ib have in some cases an improved solubility in organic solvents, such as ethylene glycol monoalkyl ether and ethylene glycol dialkyl ether, e.g. ethylene glycol monomethyl ether.

The compounds of the formula Ia and Ib according to the invention are obtained on cyclisation generally in the form of white to yellow powders, and for the most part are soluble in customary organic solvents, such as methylene chloride, chloroform, dioxane, N,N-dimethylformamide, N,N-dimethylacetamide and N-methylpyrrolidone.

EXAMPLE 1

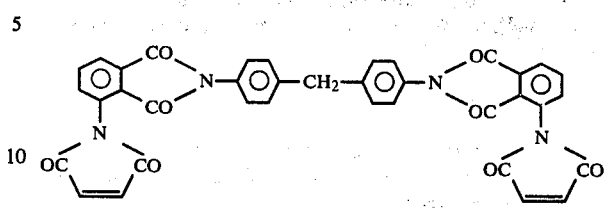

In a sulphonating flask, 91.89 g (0.378 mole) of 3-maleimidyl-phthalic acid anhydride is dissolved, in a nitrogen atmosphere, in 343 ml of anhydrous N,N-dimethylacetamide (DMA), and the solution is cooled to 0°–5° C. An addition is then made dropwise, with stirring, of a solution of 35.68 g (0.18 mole) of 4,4'-diaminodiphenylmethane in 200 ml of DMA, and after completion of the addition the reaction mixture is stirred at 20°–25° C. for a further 2 hours. There is then added 132 ml (1.44 moles) of acetic acid anhydride, and the solution is heated, with stirring, for 2 hours at 80° C. After cooling to about 20°–25° C., the reaction product is precipitated with water. The precipitate is filtered off, washed repeatedly with water, and dried for 20 hours at 80° C. in a vacuum chamber. The reaction product is then boiled in about the tenfold amount by weight of ethanol for 20 minutes and subsequently filtered hot. On drying at 80° C. under high vacuum, there is obtained 107 g of bis-3-maleiimidylphthalimide of the above formula in the form of slightly yellowish powder; m.p. 190°–210° C., yield 91% of theory.

Analysis for $C_{37}H_{20}O_8N_4$ (molecular weight 648.59): calculated: C: 68.52%; H: 3.11%; N: 8.64%. found: C: 68.7%; H: 3.3%; N: 8.4%.

The 3-maleimidylphthalic acid anhydride used in the above Example is produced, in a manner known per se, by reaction of 3-aminophthalic acid with maleic acid anhydride and cyclisation of the resulting 3-maleamidylphthalic acid with anhydrous sodium acetate and acetic anhydride (see DOS No. 2,459,673).

EXAMPLE 2

In a nitrogen atmosphere in a sulphonating flask, 43.76 g (0.18 mole) of 3-maleimidyl-phthalic acid anhydride is dissolved in 200 ml of anhydrous DMA, and the solution is cooled to 0°–5° C. To the solution obtained is added dropwise, with stirring, a solution of 17.84 g (0.09 mole) of 4,4'-diaminodiphenylmethane in 96 ml of DMA. After the addition is completed, the reaction mixture is stirred at 20°–25° C. for 30 minutes. There is then added 140 ml of anhydrous xylene and the sulphonating flask is provided with a water separator. The reaction solution is refluxed until no further water is separated. The xylene is subsequently distilled off and the reaction product is precipitated in water. The resulting precipitate is filtered off, washed several times firstly with water and then with ethanol and dried in a vacuum oven at 80° C. for 32 hours. There is obtained 50 g of bis-3-maleimidylphthalimide of the formula given in Example 1 in the form of a yellowish powder; m.p. 190°–210° C., yield 86% of theory.

Analysis for $C_{37}H_{20}O_8N_4$ (molecular weight 648.59): calculated: C: 68.52% H: 3.11% N: 8.64%. found: C: 68.24% H: 3.40% N: 8.61%.

EXAMPLE 3

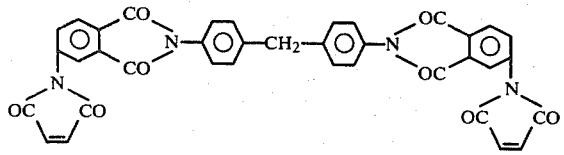

By the procedure described in Example 1, 15.31 g (0.063 mole) of 4-maleimidyl-phthalic acid anhydride is reacted with 5.94 g (0.03 mole) of 4,4'-diaminodiphenylmethane in 200 ml of DMA. After precipitation and drying, there is obtained 12.15 g of the bis-maleimidylphthalimide of the above formula in the form of yellow powder; m.p. 180°–200° C., yield 62% of theory.

The 4-maleimidylphthalic acid anhydride used as starting product is produced according to Example 3 of DOS No. 2,459,673.

EXAMPLE 4

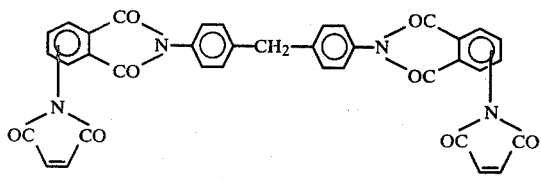

15.31 g (0.063 mole) of a 1:1 mixture of 3-maleimidylphthalic acid anhydride and 4-maleimidyl-phthalic acid anhydride is reacted with 5.94 g (0.03 mole) of 4,4'-diaminodiphenylmethane in 200 ml of DMA using the procedure described in Example 1. After precipitation, washing and drying, there is obtained 12.15 g of a mixture of isomeric bis-maleimidylphthalimides as yellow powder; m.p. 180°–210° C., yield 63% of theory.

EXAMPLE 5

For processing by the compression process, the bis-3-maleimidylphthalimide produced according to Example 2 is introduced into a compression mould, preheated to 250° C., for standard test bars, and moulded at this temperature for 1 hour under a pressure of 250 kp/cm². After removal from the mould, the resulting transparent bars are annealed in a furnace at 240° C. for 16 hours. Solid, slightly brittle moulded specimens are obtained.

EXAMPLE 6

24.31 g (0.10 mole) of 3-maleimidyl-phthalic acid anhydride is dissolved in 200 ml of methylene chloride and the solution is cooled to 0° C. An addition is then made dropwise, with stirring, of a solution of 9.92 g (0.05 mole) of 4,4'-diaminodiphenylmethane in 50 ml of methylene chloride, whereupon a voluminous precipitate is formed. The reaction mixture is stirred at 20°–25° C. for one hour and subsequently concentrated in vacuo to dryness. The residue obtained is heated under a slight vacuum at 180° C. for 1 hour and then finely pulverised to yield 30.2 g of a pre-polymer from the bis-3-maleimidylphthalimide, described in Example 1, in powder form. For processing by the compression process, the powder is introduced into a compression mould, preheated to 260° C., for standard test bars, and moulded at this temperature for 1 hour under a pressure of 250 kp/cm². On removal from the mould are obtained well consolidated, slightly brittle moulded specimens, the flexural strength of which has not decreased after ageing for 300 hours at 240° C. in air.

EXAMPLE 7

7.92 g (0.04 mole) of 4,4'-diaminodiphenylmethane is dissolved in 50 ml of anhydrous DMA in a nitrogen atmosphere in sulphonating flask, and the solution is then cooled to 0°–5° C. An addition is made dropwise, with stirring, of a solution of 6.44 g (0.02 mole) of 3,3',4,4'-benzophenonetetracarboxylic acid dianhydride, the manner of addition being such that the temperature of the reaction mixture does not exceed 15° C. After completion of the addition, the reaction mixture is stirred at 20°–25° C. for 2 hours; it is then cooled to 5° C. and a solution of 9.62 g (0.04 mole) of 4-maleimidylphthalic acid anhydride is added dropwise. After 1.5 hours' stirring at 20°–25° C., 100 ml of acetic acid anhydride is added, and the reaction solution is stirred at 20°–25° C. for a further 16 hours. It is then poured into water, the precipitated product is filtered off and washed several times with water. After filtration with suction and drying in a vacuum oven at 80° C. for 24 hours, there is obtained 20.8 g of a crosslinkable polyimide oligomer in the form of a yellow powder.

For processing by the compression process, the above powder is introduced into a compression mould, preheated to 250° C., for standard test bars, and moulded at this temperature for one hour under a pressure of 500 kp/cm². After removal from the mould, the moulded specimens are annealed at 200° C. in a furnace for 16 hours. Well consolidated moulded specimens are obtained.

EXAMPLE 8

11.90 g (0.06 mole) of 4,4'-diaminodiphenylmethane is dissolved in 160 ml of anhydrous DMA in a nitrogen atmosphere in a sulphonating flask, and the solution is cooled to −15° to −20° C. 8.42 g (0.04 mole) of trimellitic acid anhydride chloride in solid form is added portionwise, with stirring, in such a manner that the temperature of the reaction solution does not exceed −15° C. The solution is then stirred at −15° C. for 30 minutes and afterwards at 20°–25° C. for a further hour. An addition is subsequently made dropwise of 4.04 g (0.04 mole) of triethylamine in 35 ml of DMA, and a fine precipitate is formed. The reaction mixture is stirred for a further hour at 20°–25° C., and 9.72 g (0.04 mole) of a 1:1 mixture of 3- and 4-maleimidyl-phthalic acid anhydride is then added portionwise at 15°–20° C. After one hour's stirring at 20°–25° C., the precipitated triethylamine hydrochloride is separated by filtration, and 75 ml of anhydrous xylene is added to the reaction solution. The solution is then refluxed until, with the aid of a water separator, no further water can be separated. The xylene is distilled off, and the solution after cooling is precipitated in water. The precipitate obtained is filtered off, washed with water and subsequently dried at 80° C. for 40 hours in a vacuum chamber to yield 24.6 g of an oligoamide-imide containing terminal maleimidylphthalimide groups, in the form of a yellow powder.

A compression mould, preheated to 250° C., for standard test bars is filled with the above oligoamide-imide. The powder is then moulded at 260° C. under a pressure of 500 kp/cm² for 40 minutes. The resulting moulded specimens are removed from the mould and annealed at 240° C. for 16 hours to obtain transparent solid moulded specimens.

EXAMPLE 9

By a procedure analogous to that described in Example 8, 19.82 g (0.10 mole) of 4,4'-diaminodiphenylmethane, 16.84 g (0.08 mole) of trimellitic acid anhydride chloride, 8.08 g (0.08 mole) of triethylamine and 9.72 g (0.04 mole) of 3-maleimidyl-phthalic acid anhydride are reacted in 330 ml of anhydrous DMA, and the precipitated triethylamine hydrochloride is removed. To the filtered reaction solution is then added dropwise, with stirring, 200 ml of acetic acid anhydride, and stirring is maintained at 20°–25° C. for 16 hours. The reaction solution is subsequently poured into water, the precipitated product is separated, washed with water and dried in a vacuum drying chamber for 16 hours at 80° C. and 130° C., respectively. There is obtained 37.2 g of a still crosslinkable oligoamide-imide in the form of a yellow powder.

For processing by the compression process, the oligoamide-imide powder obtained is well mixed with 2 percent by weight of dicumyl peroxide; the mixture is introduced into a compression mould for circular discs, preheated to 220° C., and moulded under a pressure of 225 kp/cm$^2$ for 15 minutes at 225° C. and for 5 minutes at 260° C. A transparent disc having a good mechanical strength is obtained.

If the oligoamide-imide is introduced without additives into the compression mould and moulded at 265° C. under a pressure of 225 kp/cm$^2$ for 10 minutes, there is likewise obtained a transparent disc from the crosslinked polyamide-imide.

EXAMPLE 10

4.32 g (0.04 mole) of m-phenylenediamine is dissolved in 100 ml of anhydrous DMA in a nitrogen atmosphere in a sulphonating flask, and the solution is cooled to −15° C. 6.09 g (0.03 mole) of isophthalic acid dichloride is added portionwise, with stirring, in such a manner that the temperature of the reaction mixture does not exceed −10° C. The reaction solution is then stirred at −15° C. for 30 minutes and subsequently at 20°–25° C. for a further hour. An addition is then made dropwise at 6.07 g (0.06 mole) of triethylamine in 40 ml of anhydrous DMA, with a white precipitate being formed. The reaction mixture is stirred for a further hour at 20°–25° C., and there is then added portionwise, at 15°–20° C., 4.86 g (0.02 mole) of a 1:1 mixture of 3- and 4-maleimidyl-phthalic acid anhydride. After stirring for one hour at 20°–25° C., the precipitated triethylamine hydrochloride is filtered off. An addition is then made dropwise, with stirring, of 90 ml of acetic acid anhydride. The reaction solution is stirred for 16 hours at 20°–25° C., and is then poured into water. The precipitated product is filtered off, washed with water and dried in a vacuum drying chamber at 80° C. for 40 hours. 11.5 g of a crosslinkable oligoamide in the form of a slightly yellowish powder is obtained.

The above oligoamide powder is introduced into a compression mould, preheated to 220° C., for circular discs and then moulded at this temperature under a pressure of 675 kp/cm$^2$ for 30 minutes. After removal from the mould, transparent, slightly brittle moulded specimens are obtained.

EXAMPLE 11

11.92 g (0.048 mole) of 4,4'-diaminodiphenylsulphone, 8.93 g (0.044 mole) of isophthalic acid dichloride, 8.90 g (0.088 mole) of triethylamine and 1.93 g (0.008 mole) of 3-maleimidyl-phthalic acid anhydride are reacted in 215 ml of anhydrous DMA using the procedure described in Example 10. The triethylamine hydrochloride is filtered off and the reaction solution is poured directly into water. The precipitated product is washed with water and dried in a vacuum drying chamber for 40 hours at 80° C. and for 3 hours at 150° C. to leave 16.6 g of a crosslinkable polyamide in the form of a yellowish powder.

The above polyamide powder is introduced into a compression mould, heated to 300° C., for circular discs and then moulded at this temperature under a pressure of 225 kp/cm$^2$ for 30 minutes to obtain well consolidated transparent discs.

EXAMPLE 12

4.32 g (0.04 mole) of m-phenylenediamine is dissolved in 100 ml of anhydrous DMA in a nitrogen atmosphere in a sulphonating flask, and the solution is cooled to −15° to −20° C. Whilst stirring is maintained, 8.37 g (0.035 mole) of sebacic acid dichloride is added dropwise in such a manner that the temperature of the reaction mixture does not exceed −15° C. The reaction mixture is then stirred for 1 hour at 20°–25° C. With cooling again to −15° C., an addition is made dropwise of 7.08 g (0.07 mole) of triethylamine in 14 ml of DMA, whereupon a white precipitate is formed. The reaction mixture is stirred at 20°–25° C. for a further hour, and the precipitated triethylamine hydrochloride is removed by filtration. The precipitate is washed with 30 ml of DMA, and to the filtrate at 0° C. is added 2.43 g (0.01 mole) of 3-maleimidyl-phthalic acid anhydride. The reaction solution obtained is stirred for 2 hours at 20°–25° C.; 80 ml of acetic acid anhydride is then added dropwise, the reaction solution is stirred for 16 hours at 20°–25° C., and finally poured into water. The precipitated product is filtered off, washed several times with water and dried in a vacuum drying chamber for 16 hours at 80° C./20 torr and for 16 hours at 80° C./10$^{-1}$ torr to obtain 11.1 g of a crosslinkable oligoamide in the form of a slightly yellowish powder.

For processing by the compression process, the above oligoamide powder is heated for 80 minutes at 165° C./10$^{-1}$ torr; it is then introduced into a compression mould, preheated to 195° C., for circular discs, and moulded at this temperature for 90 minutes under a pressure of 325 kp/cm$^2$. After removal from the mould, the moulded specimens are annealed at 150° C. for 16 hours. Solid transparent discs are obtained.

EXAMPLE 13

In a nitrogen atmosphere in a sulphonating flask, 11.99 g (0.06 mole) of 4,4'-diaminodiphenylmethane is dissolved in 350 ml of anhydrous DMA, and the solution is cooled to 0°–5° C. While stirring is maintained, 12.89 g (0.04 mole) of 3,3',4,4'-benzophenone-tetracarboxylic acid dianhydride is added portionwise in such a manner that the temperature does not exceed 5° C. After completion of the addition, the reaction mixture is stirred for 1 hour at 20°–25° C.; it is then cooled to 5° C. and 12.36 g (0.04 mole) of 3-nadicimidylphthalic acid anhydride in solid form is added. After 1 hour's stirring at 20°–25° C., 100 ml of anhydrous toluene is added, and the reaction solution is refluxed until, with the aid of a water separator, no further water is separated therefrom. The toluene is subsequently distilled off and the reaction solution is poured into water. The resulting precipitate is filtered, washed several times with water and dried in a vacuum oven at 80° C. for 32 hours to yield 25.3 g of a crosslinkable polyimide oligomer in the form of a yellowish powder.

For processing by the compression process, the above oligomer is firstly heated at 300° C. for 5 minutes, then again finely pulverised and introduced into a compression mould, heated to 320° C., for circular discs. The powder is subsequently moulded at this temperature for 45 minutes under a pressure of 100 kp/cm² to obtain transparent solid moulded specimens.

The 3-nadicimidylphthalic acid anhydride [3-(bicyclo[1.2.2]hept-5-ene-2,3-dicarboxylic acid imidyl)-phthalic acid anhydride] is produced, in a manner known per se, by reaction of 3-aminophthalic acid with nadic acid anhydride and cyclisation of the resulting 3-nadicamidyl-phthalic acid with anhydrous sodium acetate and acetic anhydride (see DOS No. 2,459,673).

EXAMPLE 14

7.93 g (0.04 mole) of 4,4'-diaminodiphenylmethane, 4.36 g (0.02 mole) of pyromellitic acid dianhydride and 12.36 g (0.04 mole) of a 1:1 mixture of 3- and 4-nadicimidylphthalic acid anhydride are reacted in 235 ml of anhydrous DMA and 80 ml of toluene by the procedure described in Example 13. There is obtained 19.97 g of a slightly yellowish powder which, for processing, is introduced into a compression mould, heated to 295° C., for circular discs. The powder is then moulded at this temperature for 5 minutes under contact pressure and for 60 minutes under a pressure of 100 kp/cm² to obtain well consolidated discs.

EXAMPLE 15

In a nitrogen atmosphere in a sulphonating flask, 15.4 g (0.05 mole) of 3-nadicimidylphthalic acid anhydride is dissolved in 195 ml of DMA, and reacted with 5.0 g (0.025 mole) of 4,4'-diaminodiphenyl ether and 50 ml of toluene using the procedure described in Example 13. There is obtained 16.55 g of bis-imide of the formula

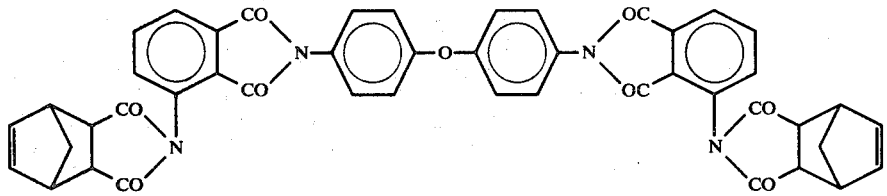

as a slightly yellowish powder which softens under pressure at 200° C.

EXAMPLE 16

By the procedure described in Example 15, 15.45 g (0.05 mole) of a 1:1 mixture of 3- and 4-nadicimidylphthalic acid anhydride is reacted with 2.90 g (0.025 mole) of 1,6-diaminohexane in 175 ml of anhydrous DMA and 80 ml of toluene. There is obtained 11.67 g of bis-imide of the formula

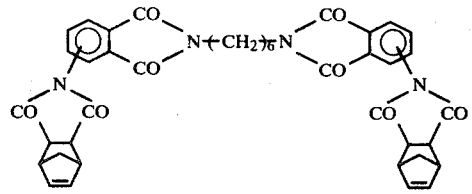

in the form of a yellowish powder which softens at 120° C. under pressure.

EXAMPLE 17

By the procedure described in Example 12, 1.95 g (0.018 mole) of m-phenylenediamine, 3.59 g (0.015 mole) of sebacic acid dichloride, 3.303 g (0.03 mole) of triethylamine and 1.63 g (0.006 mole) of 3-(2,3-dimethylmaleimidyl)phthalic 150° C./20 torr, 16 hours at 150° C./10⁻¹ torr and 1 hour at 200° C./10⁻¹ torr. The specimens are then irradiated for 2 hours with a 400 watt UV lamp. A transparent, slightly brittle coating is obtained.

The 3-(2,3-dimethylmaleimidyl)-phthalic acid anhydride used in the above Example can be produced, in a manner known per se, by reaction of 3-aminophthalic acid with 2,3-dimethylmaleic acid anhydride, and cyclisation of the resulting 3-(2,3-dimethylmaleamidyl)-phthalic acid, e.g. with acetic acid ethyl ester.

EXAMPLE 18

By the procedure described in Example 10, 3.46 g (0.032 mole) of m-phenylenediamine, 4.87 g (0.024 mole) of isophthalic acid dichloride, 4.85 g (0.048 mole) of triethylamine and 5.04 g (0.016 mole) of 4-maleimidyltrimellitic acid anhydride ethyl ester are reacted in 130 ml of anhydrous DMA. After imidisation, with 60 ml of acetic acid anhydride, precipitation in water, washing and drying, there is obtained 6.25 g of bis-imidyl ester in the form of a yellowish powder.

For processing by hot compression moulding, the above powder is introduced into a compression mould, preheated to 265° C., for circular discs, and moulded at this temperature for 30 minutes under a pressure of 100 kp/cm². Well consolidated discs are obtained.

The 5-maleimidyltrimellitic acid anhydride ethyl ester used in the above Example can be produced as follows:

61.33 g (0.24 mole) of 4-nitrotrimellitic acid anhydride chloride (obtained by chlorination of 4-nitrotrimellitic acid anhydride with thionyl chloride) is dissolved in 120 ml of dioxane, and 13.94 ml (0.24 mole) of ethanol is added with stirring. The reaction mixture is stirred for 12 hours at 25° C., then heated for 1 hour at 80° C. and finally concentrated by evaporation to dryness. The residue is dissolved in 180 ml of dioxane; 100 ml of water is added dropwise and, after one hour, the solution is concentrated by evaporation to dryness. The residue obtained is finely suspended in 100 ml of benzene, filtered off with suction, and dried at 80° C. in a drying chamber to obtain 60.5 g of 4-nitrotrimellitic acid ethyl ester, m.p. 189°–191° C. 65.13 g (0.23 mole) of this ester is dissolved in 150 ml of dioxane and hydrogenated in the presence of 6.5 g of a palladium charcoal catalyst, containing 5% by weight of Pd, at 30° C. The reaction solution is filtered; 27 g of maleic anhydride is added and the solution is left to stand for 12 hours at 20°–25° C. The solution is then concentrated by evaporation at 40°–60° C., and to the oily residue is added, with stirring, 250 ml of diethyl ether. The 4-maleamidyl-trimellitic acid ethyl ester, which precipitates as a fine white substance, is filtered off with suction and dried at 50° C. in a drying chamber. There is obtained 76.7 g of the stated ester; m.p. 142°–144° C. 58 g (0.165 mole) of the 4-maleamidyl-trimellitic acid ethyl ester is slowly introduced at 80° C., in the course of 15 minutes, into a mixture of 65 ml of acetic anhydride and 14.5 g of sodium acetate. The reaction mixture is stirred for 3 hours at this temperature; it is then concentrated by evaporation to dryness and the residue is extracted three times with 200 ml of toluene each time. The combined toluene extracts are concentrated by evaporation to dryness. The solid residue is dissolved hot in 100 ml of toluene and then filtered. The 4-maleimidyl-trimellitic acid anhydride ethyl ester that has crystallised out on cooling of the solution is filtered off with suction and dried in a drying chamber at 70° C. to obtain 39.6 g of 4-maleimidyl-trimellitic acid anhydride ethyl ester, m.p. 178°–179° C.

EXAMPLE 19

7.93 g (0.04 mole) of 4,4'-diaminodiphenylmethane is dissolved in 130 ml of anhydrous DMA in a nitrogen atmosphere in a sulphonating flask, and the solution is cooled to −15° C. With stirring, 6.49 g (0.032 mole) of isophthalic acid dichloride is added portionwise so that the temperature of the reaction solution does not exceed −10° C. The reaction solution is then further stirred for 30 minutes at −15° C. and subsequently for 1 hour at 20°–25° C. The reaction solution is thereupon again cooled to −15° C., and a solution of 8.09 g (0.08 mole) of triethylamine in 50 ml of DMA is added dropwise with the result that a white precipitate is formed. The reaction mixture is stirred for 1 hour at 20°–25° C.; it is again cooled to −15° C. and 4.66 g (0.016 mole) of 4-maleimidyl-trimellitic acid anhydride chloride is added. After one hour's stirring at 20°–25° C., the reaction mixture is precipitated in methanol; the precipitate is filtered off, washed with water, and dried in a vacuum oven at 80° C. for 36 hours to obtain 13.18 g of crosslinkable oligomer in the form of a yellowish powder.

This powder is introduced into a compression mould, heated at 265° C., for circular discs and at this temperature is moulded for 30 minutes under a pressure of 450 kp/cm². On removal from the mould, tough solid moulded specimens are obtained.

The 4-maleimidyl-trimellitic acid anhydride chloride used in the above Example is produced as follows:

102 g (0.4 mole) of 4-nitrotrimellitic acid (obtained by nitration of trimellitic acid anhydride with $H_2SO_4$/$HNO_3$) is hydrogenated in the presence of 10 g of a palladium charcoal catalyst, containing 5% by weight of Pd, at 30° C. in 1000 ml of dioxane. The reaction solution is filtered, and 46.8 g (0.48 mole) of maleic acid anhydride is then added. The reaction mixture is allowed to stand for 12 hours at 20°–25° C. and is subsequently concentrated to dryness at 60° C. in a rotary evaporator. The residue is heated to boiling twice, with stirring, with 400 ml of acetic acid ethyl ester each time; it is then filtered off with suction and dried at 80° C./100 torr for 24 hours to obtain 105 g of 4-maleamidyl-trimellitic acid.

32.3 g (0.1 mole) of the 4-maleamidyl-trimellitic acid is mixed with 1.6 g of anhydrous sodium acetate and 83 ml of acetic anhydride, and heated at 80° C. for 30 minutes. The formed solution is concentrated by evaporation to dryness and subsequently dried at 50° C./0.05 torr. 200 ml of thionyl chloride is added to the residue and the reaction mixture is heated at 80° C. for 2.5 hours. It is then concentrated to dryness and 150 ml of benzene is added; the reaction mixture is filtered, the filtrate is concentrated by evaporation and finally dried at 80° C./0.1 torr. After washing with cyclohexane and benzene and then drying, 18.31 g of crystalline 4-maleimidyl-trimellitic acid anhydride chloride, m.p. 143°–144° C., is obtained.

EXAMPLE 20

3.78 g (0.012 mole) of 4-maleimidyl-trimellitic acid anhydride ethyl ester and 1.19 g (0.006 mole) of 4,4'-diaminodiphenylmethane are reacted in 47 ml of anhydrous DMA using the procedure described in Example 1. After imidisation with 20 ml of acetic acid anhydride, precipitation, washing and drying, 3.86 g of bis-imidyl ester of the formula

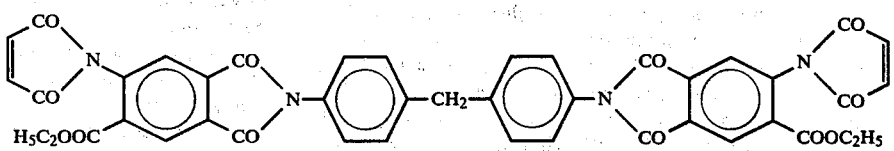

is obtained in the form of a yellow powder.

For processing by compression moulding, the above powder is firstly subjected to a preliminary chain-lengthening reaction for 30 minutes at 200° C., again pulverised and then introduced into a compression mould, heated to 200° C., for circular discs. The powder is moulded under a pressure of 100 kp/cm² for 50 minutes, with the temperature rising from 200° C. to 250° C. Transparent solid discs are obtained.

We claim:

1. A crosslinkable compound of the formula

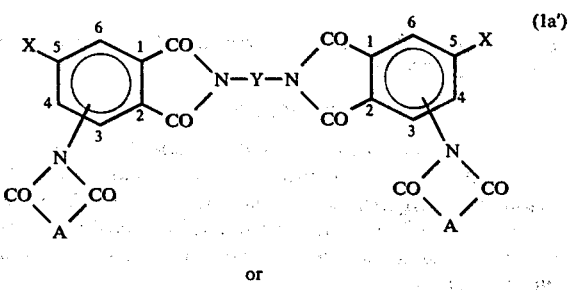

or

-continued

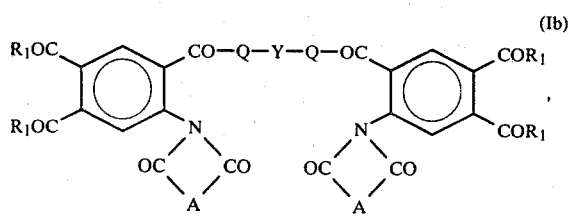

wherein the X s independently of one another represent hydrogen or, if the radical

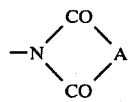

is in the 4-position of the benzene ring, also —$COR_2$, the $R_2$ s independently of one another represent hydroxyl, phenoxy; phenoxy substituted by one or two nitro groups, by one alkyl of 1 to 2 carbon atoms, by one alkoxy of 1 to 2 carbon atoms or by two or five halogen atoms; alkoxy of 1 to 18 carbon atoms or an O—M+ group, the $R_1$ s independently of one another have the same meaning as the $R_2$ s or two adjacent $R_1$ s together represent the —O— grouping, the A s independently of one another represent a radical of the formula

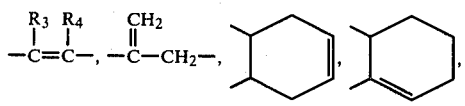

$R_3$ and $R_4$ independently of one another represent hydrogen, chlorine, bromine or methyl, M+ represents an alkali metal cation, a trialkylammonium cation having 3–24 carbon atoms, or the benzyltrimethylammonium or tetramethylammonium cation, Q represents —NH—, and Y represents a structural element of the formula

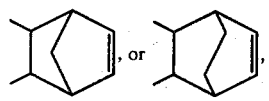

wherein a represents a number from 1–100,

Z represents alkylene of 2 to 10 carbon atoms, 1,3-phenylene, 1,4-phenylene, the 4,4'-diphenylmethane group, the 4,4'-diphenylsulfone group or the 4,4'-diphenyl ether group, and $Z_1$ represents a benzenetriyl group, in which the

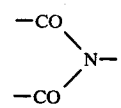

group is bound to ortho carbons of $Z_1$.

2. A crosslinkable compound according to claim 1 of formula Ia' wherein the two radicals

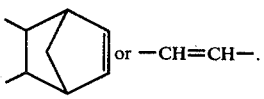

independently of one another are in the 3- or 4-position of the benzene ring, X represents hydrogen or —$COR_2$ where $R_2$ is alkoxy of 1 to 4 carbon atoms, and A represents the radical of the formula

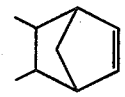or —CH=CH—.

3. A crosslinkable compound according to claim 1 wherein A is —CH=CH—.

4. A crosslinkable compound according to claim 1 of formula Ib wherein the $R_1$ s each represent a hydroxyl group or each two adjacent $R_1$ s together form the —O— grouping, and A represents the radical of the formula

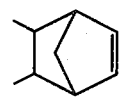

or —CH=CH—.

5. A crosslinkable compound according to claim 1 wherein A represents

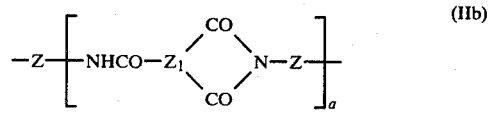

or —CH=CH—, X represents a —COOalkyl group having 1–4 carbon atoms in the alkyl moiety or hydrogen, the $R_1$ s each represent a hydroxyl group, or two adjacent $R_1$ s together represent the —O— grouping, a represents an integer from 1–10, and Z represents the 4,4'-diphenylmethane group or the 4,4'-diphenyl ether group.

6. A crosslinkable compound according to claim 1 wherein X is hydrogen, A is —CH=CH—, a is 2, Z is the 4,4'-diphenylmethane group and $Z_1$ is 1,2,4-benenetriyl.

7. A crosslinkable compound according to claim 1 wherein X is hydrogen, A is —CH=CH—, Y represents a structure of formula IIb, a is 4, Z is the 4,4' diphenylmethane group and $Z_1$ is 1,2,4-benzenetriyl.

* * * * *